United States Patent
Stephansen et al.

(10) Patent No.: US 12,528,253 B2
(45) Date of Patent: Jan. 20, 2026

(54) POWDER SMOKE DETECTION DURING ADDITIVE MANUFACTURING

(71) Applicant: Freemelt AB, Mölndal (SE)

(72) Inventors: Robin Stephansen, Mölndal (SE); Ulf Ackelid, Gothenburg (SE)

(73) Assignee: FREEMELT AB, Mölndal (SE)

( * ) Notice: Subject to any disclaimer, the term of this patent is extended or adjusted under 35 U.S.C. 154(b) by 145 days.

(21) Appl. No.: 18/518,667

(22) Filed: Nov. 24, 2023

(65) Prior Publication Data

US 2024/0246298 A1    Jul. 25, 2024

(30) Foreign Application Priority Data

Jan. 20, 2023    (SE) .................................... 2350051-5

(51) Int. Cl.
*B29C 64/393*    (2017.01)
*B29C 64/153*    (2017.01)
(Continued)

(52) U.S. Cl.
CPC .......... *B29C 64/393* (2017.08); *B29C 64/153* (2017.08); *B29C 64/268* (2017.08); *B33Y 50/00* (2014.12); *B33Y 30/00* (2014.12)

(58) Field of Classification Search
CPC ........ B29C 64/393; B33Y 50/02; B22F 12/90
See application file for complete search history.

(56) References Cited

U.S. PATENT DOCUMENTS 8,586,922 B2 *  11/2013  Nagaoki ................. H01J 37/26
                                                    250/311
8,992,816 B2 *   3/2015  Jonasson ............... B29C 64/268
                                                    264/401
(Continued)

FOREIGN PATENT DOCUMENTS

DE    102018102082 A1    8/2019
EP       2231352 A1      9/2010
(Continued)

OTHER PUBLICATIONS

Examination and Search Report for Swedish Application No. SE 2350051-5, mailed on Aug. 8, 2023, 5 pages.
(Continued)

*Primary Examiner* — Xiao S Zhao
*Assistant Examiner* — Nicholas J Chidiac
(74) *Attorney, Agent, or Firm* — MEDLER FERRO WOODHOUSE & MILLS PLLC

(57) ABSTRACT

In accordance with one or more embodiments herein, an arrangement for additive manufacturing by selective fusion, using an electron beam, of a three-dimensional product from a powder bed, is provided. The arrangement comprises at least one electron detecting arrangement arranged to detect powder smoke by detecting electrons which have been scattered by the electron beam hitting powder particles which levitate above the powder bed. Also provided is a method for detecting powder smoke during additive manufacturing, the method comprising: arranging at least one electron detecting arrangement in an arrangement for additive manufacturing by selective fusion, using an electron beam, of a three-dimensional product from a powder bed; detecting electrons which have been scattered by the electron beam hitting powder particles which levitate above the powder bed; and determining whether there is powder smoke based on the output from the at least one electron detecting arrangement.

16 Claims, 7 Drawing Sheets

(51) Int. Cl.
*B29C 64/268* (2017.01)
*B33Y 30/00* (2015.01)
*B33Y 50/00* (2015.01)

(56) References Cited

U.S. PATENT DOCUMENTS

| | | | | |
|---|---|---|---|---|
| 11,534,963 | B2 | 12/2022 | Ljungblad | |
| 11,642,740 | B2* | 5/2023 | Theile | B33Y 10/00 700/207 |
| 2010/0270708 | A1* | 10/2010 | Jonasson | B29C 64/153 264/401 |
| 2012/0235035 | A1* | 9/2012 | Nagaoki | H01J 37/26 250/311 |
| 2018/0281066 | A1* | 10/2018 | Schuster | B33Y 30/00 |
| 2019/0118286 | A1 | 4/2019 | Sugatani et al. | |
| 2020/0306867 | A1 | 10/2020 | Shionuma | |
| 2021/0094100 | A1 | 4/2021 | Ljungblad | |
| 2021/0154741 | A1* | 5/2021 | Kitamura | B22F 10/85 |
| 2021/0154764 | A1* | 5/2021 | Tsutagawa | B22F 12/90 |
| 2021/0170518 | A1* | 6/2021 | Theile | G05B 13/027 |
| 2024/0335885 | A1* | 10/2024 | Tsutagawa | B33Y 10/00 |
| 2024/0335886 | A1* | 10/2024 | Tsutagawa | B22F 10/28 |

FOREIGN PATENT DOCUMENTS

| | | |
|---|---|---|
| EP | 3473358 A1 | 4/2019 |
| EP | 3693164 A1 | 8/2020 |
| EP | 3831515 A1 | 6/2021 |
| WO | 2009/084991 A1 | 7/2009 |
| WO | 2019/149678 A1 | 8/2019 |

OTHER PUBLICATIONS

Ye et al., "Electron-optical observation of smoke evolution during electron beam powder bed fusion", Additive Manufacturing, vol. 70, No. 1, Apr. 23, 2023, pp. 103578 (1-7).

European Search Report for EP Patent Application No. 23211938.8, issued on Jun. 10, 2024, 8 pages.

* cited by examiner

POWDER SMOKE DETECTION DURING ADDITIVE MANUFACTURING

CROSS-REFERENCE TO PRIOR APPLICATION

This application claims benefit of Swedish Patent Application No. 2350051-5, filed Jan. 20, 2023, which contents are incorporated herein in their entirety by reference.

TECHNICAL FIELD

The present disclosure relates generally to powder smoke detection during additive manufacturing.

BACKGROUND

When an electron beam interacts with a powder bed during an additive manufacturing process such as e.g. Electron Beam Powder Bed Fusion (E-PBF), there will be a large number of electrons charging the powder grains in the powder bed. If the electrical conductivity of the powder bed is too low to efficiently dissipate the electric charge induced by the electron beam, the powder bed may accumulate charge to reach a critical state where repelling electrostatic forces between the powder grains exceed gravitational forces, causing the powder grains to levitate from the powder bed. Levitated charged powder grains will repel from other levitated charged powder grains and from the powder bed, causing powder smoke to scatter throughout the manufacturing chamber. If such powder smoke is created, this means that there may no longer be enough powder in the required positions in the powder bed, which may cause failure in the additive manufacturing process. There is also the risk of such powder ending up in locations where it may damage equipment such as e.g. the particle beam source. U.S. Ser. No. 11/534,963 describes a method of reducing such electrostatic charging in the powder bed.

EP3693164 describes the detection of powder smoke using an X-ray detector that detects an X-ray that is generated when powder smoke is generated in a powder bed.

EP2231352 describes various embodiments of a powder-lifting detection device which is arranged to detect powder particles that either hit a detector or are visible to a detector.

Problems with the Prior Art

The detectors proposed in EP3693164 and EP2231352 detect the powder smoke when it has become so tangible that it can be viewed, or detected by the actual powder particles hitting a detector arranged at a side of the powder bed. This means that the powder smoke is not detected until there is a large powder cloud that spreads powder particles far from the powder bed. At this stage, there may already be a risk of damage to the additive manufacturing apparatus.

There is thus a need for an improved method for powder smoke detection during additive manufacturing.

SUMMARY

The above described problem is addressed by the claimed arrangement for additive manufacturing by selective fusion, using an electron beam, of a three-dimensional product from a powder bed. The arrangement preferably comprises at least one electron detecting arrangement arranged to detect powder smoke by detecting electrons which have been scattered by the electron beam hitting powder particles which levitate above the powder bed.

The above described problem is further addressed by the claimed method for detecting powder smoke during additive manufacturing. The method preferably comprises: arranging at least one electron detecting arrangement in an arrangement for additive manufacturing by selective fusion, using an electron beam, of a three-dimensional product from a powder bed; detecting electrons which have been scattered by the electron beam hitting powder particles which levitate above the powder bed; and determining whether there is powder smoke based on the output from the at least one electron detecting arrangement.

This enables a very quick detection of powder smoke, since as soon as powder particles begin to levitate above the powder bed, they cause scattering of electrons in different directions, when the electron beam hits the powder particles.

In embodiments, the at least one electron detecting arrangement comprises an electron detector and a directional blocking arrangement, arranged to prevent any electrons not travelling in a selected direction from reaching the electron detector. This may be used to ensure that only electrons scattered by powder particles located close to the powder bed reach the electron detector.

In embodiments, at least one directional blocking arrangement is in the form of a number of plates having slits or holes in positions that are aligned between the plates. This is a simple way of creating a directional blocking arrangement, since electrons coming from other positions may pass the first slit or hole, but will then become trapped between the plates. It is possible to also apply electric potentials to the plates, in order to attract or repel electrons having certain energies.

In embodiments, at least one directional blocking arrangement is in the form of one or more channels. The channels may e.g. be formed by holes in the directional blocking arrangement, or by walls forming channels.

In embodiments, at least one directional blocking arrangement is in the form of one or more channels having a surface comprising a material with low tendency to create scattered electrons. This is a simple way of creating a directional blocking arrangement, since electrons coming from other positions may not pass through the one or more channels.

In embodiments, at least one directional blocking arrangement is in the form of a number of ring-shaped slits inside a ring-shaped electron detector. The advantage of using a ring-shaped detector is that the detection area will be large, which provides a high sensitivity to electrons scattered from powder smoke. The ring-shaped detector does not have to be circular, but may have any shape as long as it comprises a hole for the electron beam. The ring-shaped detector may e.g. have a shape that corresponds the shape of the powder bed, so that it surrounds the whole powder bed.

In embodiments, at least one electron detecting arrangement is arranged at a side of the powder bed.

In embodiments, at least one electron detecting arrangement is arranged below the powder bed.

In embodiments, at least one electron detecting arrangement is arranged above the powder bed.

It is also possible for the arrangement to comprise multiple electron detecting arrangements, located in different positions in the arrangement. This increases the sensitivity of the detection of electrons scattered from powder smoke.

In embodiments, the arrangement is arranged to immediately switch off the electron beam if powder smoke is detected by at least one electron detecting arrangement in the arrangement. The arrangement may in embodiments be arranged to alert an operator of the arrangement when powder smoke has been detected.

The term "scattered electrons" in this application comprises any type of electrons which have been generated by the interaction between the incident electron beam and the target material, regardless of whether these electrons are high-energy backscattered electrons, which are electrons reflected or deflected against atomic nuclei, or low-energy secondary electrons, which have been excited and released from the target material due to interaction with the incident electron beam.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

In additive manufacturing using a particle beam, such as e.g. Electron Beam Powder Bed Fusion (E-PBF), there is always the risk of electrostatic charging in the powder bed, causing levitation and scattering of charged powder, thereby creating powder smoke. Such powder smoke should be detected as soon as possible, preferably before the powder starts spreading inside the additive manufacturing arrangement.

According to the claimed invention, at least one electron detecting arrangement is used to detect electrons that are scattered by hitting powder particles which levitate above the powder bed. This means that as soon as powder particles begin to lift from the powder bed, this will be detected, since these particles will cause electrons to scatter in different directions, when the electron beam hits the powder particles.

The present disclosure relates generally to apparatuses and methods for additive manufacturing. Embodiments of the disclosed solution are presented in more detail in connection with the figures.

Figure 1:
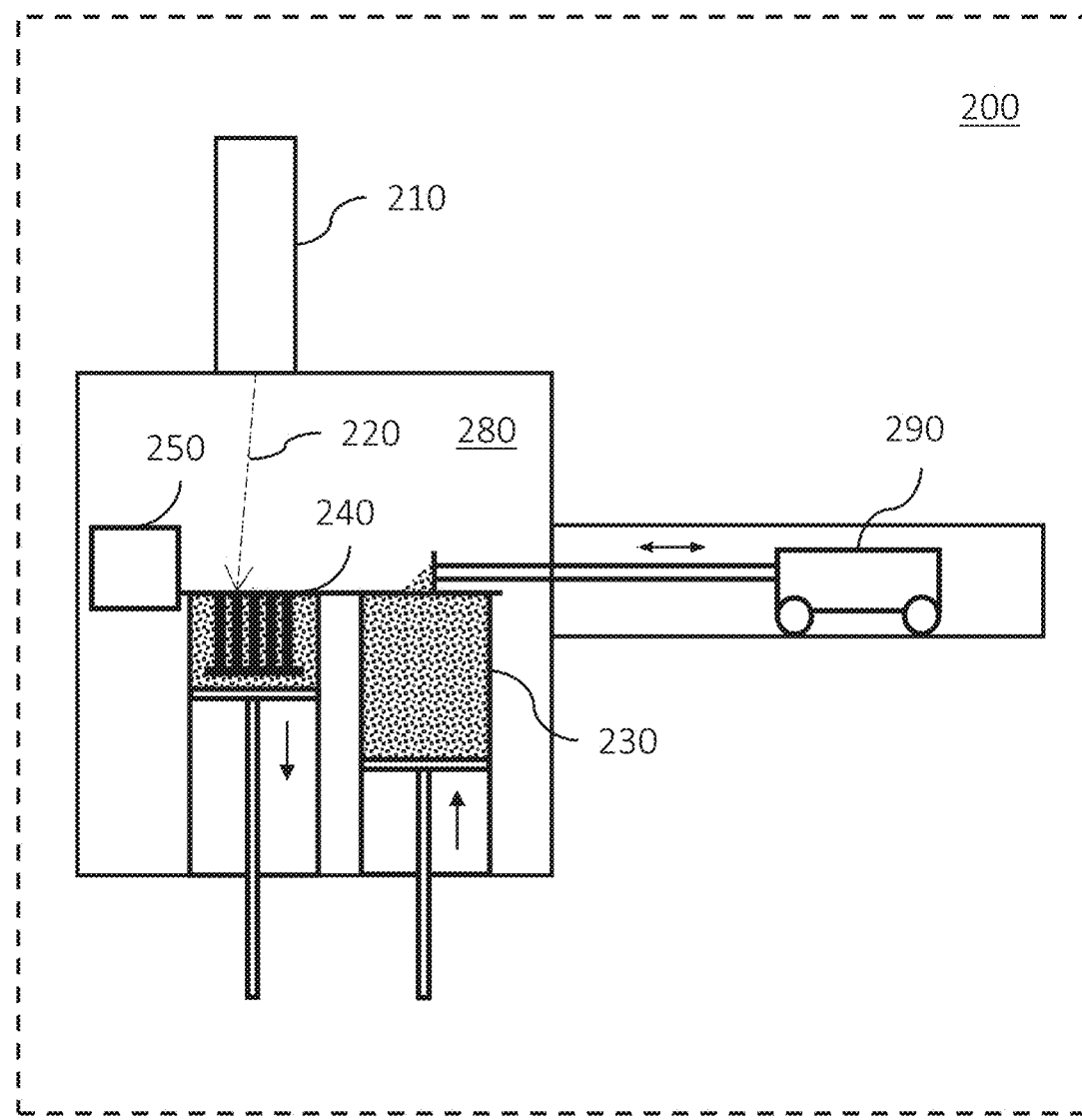
FIGS. 1-3 schematically illustrate embodiments of an arrangement for additive manufacturing by selective fusion, using an electron beam, of a three-dimensional product from a powder bed, in accordance with one or more embodiments described herein.
Figure 2:
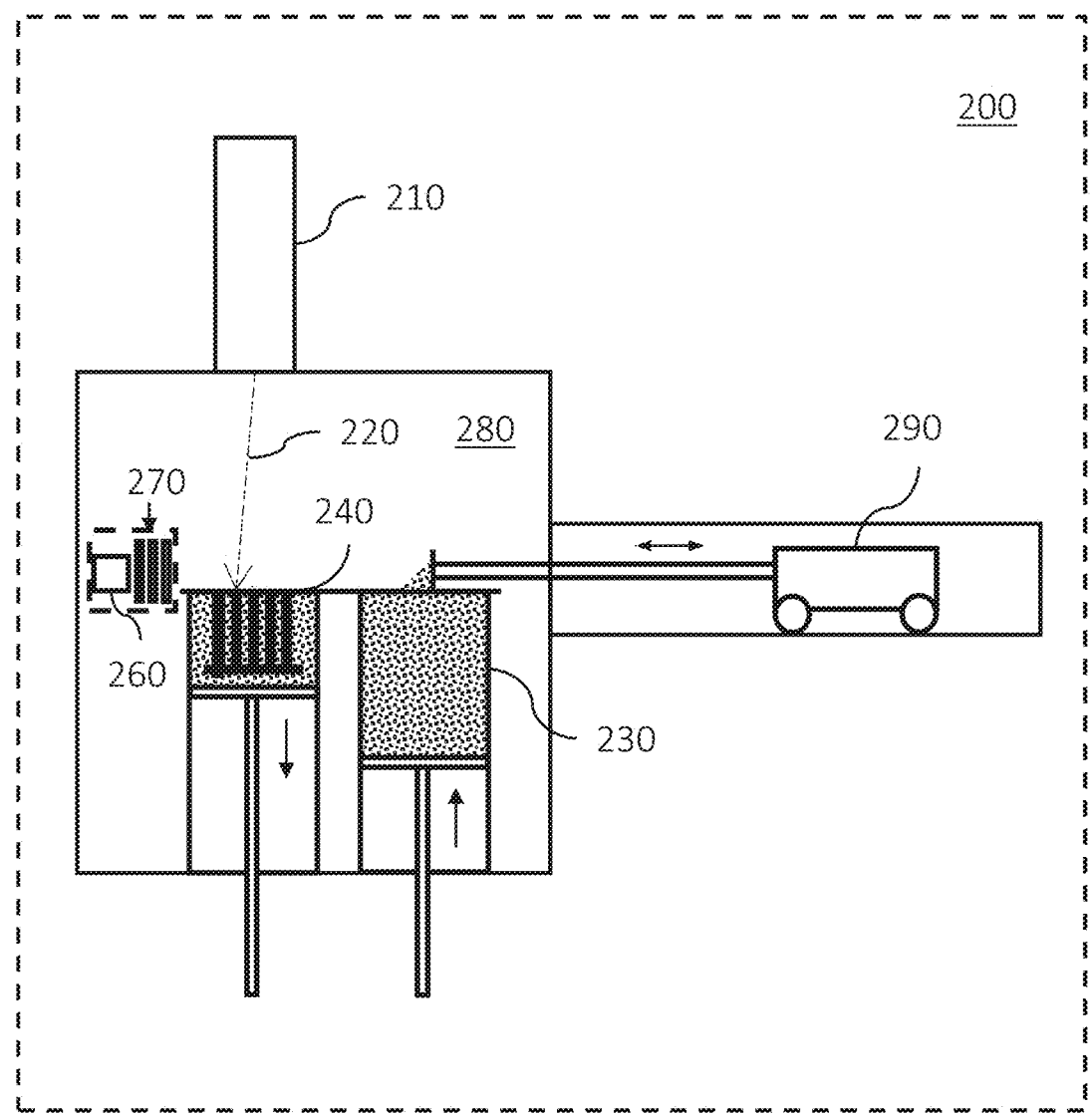
Figure 3:
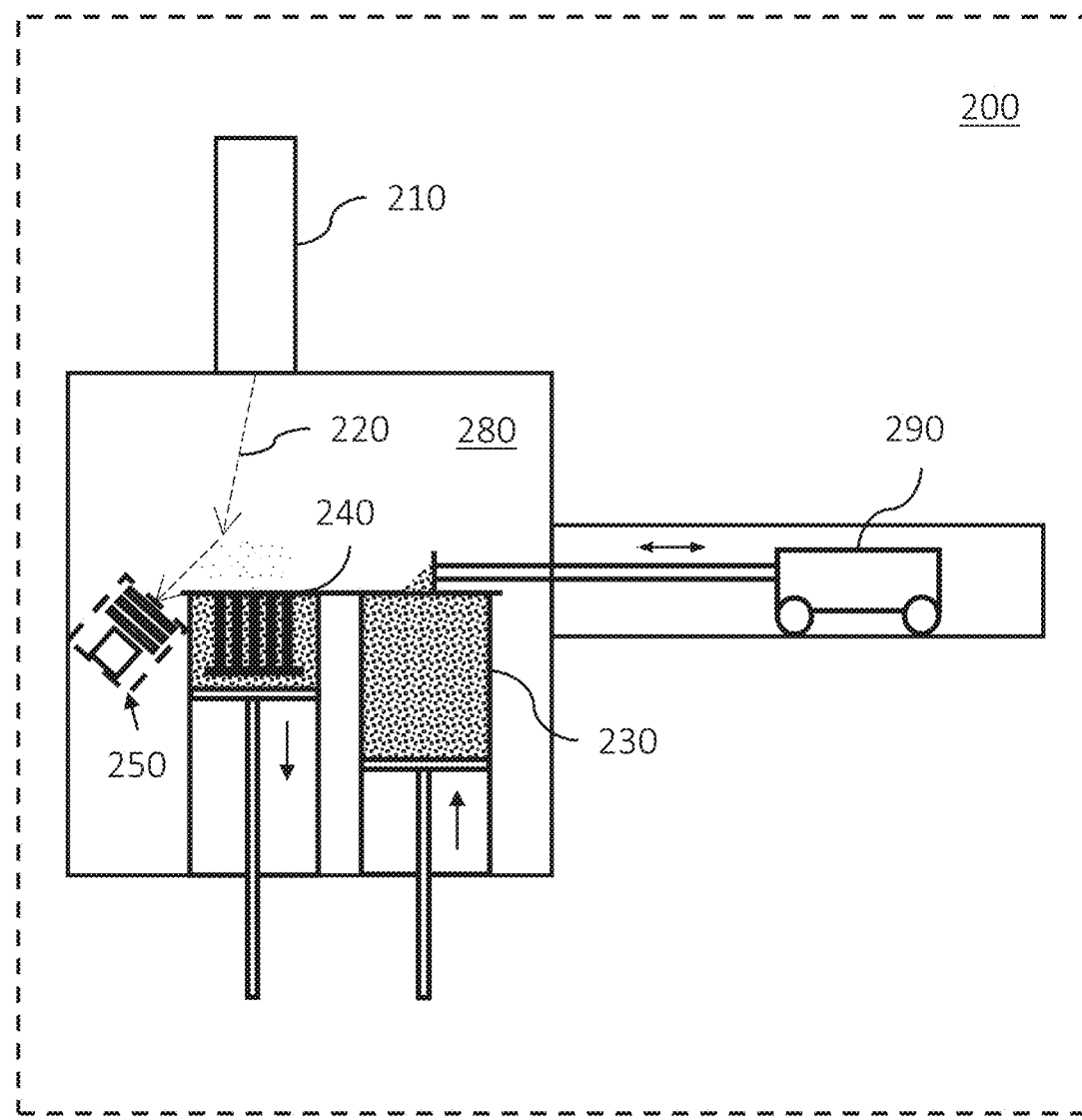

FIGS. 1-3 schematically illustrate embodiments of an arrangement 200 for additive manufacturing by selective fusion, using an electron beam 220, of a three-dimensional product from a powder bed 240. The illustrated additive manufacturing arrangement 200 comprises an electron beam source 210 and a powder bed 240, arranged in a vacuum chamber 280. The powder bed 240 may e.g. be formed by powder being distributed from a powder tank 230 using a recoater mechanism 290. The powder bed 240 may comprise powder material of any kind, such as e.g. powder composed of pure metal, metal alloys, intermetallics, ceramics, glass, graphite, diamond, composites, polymers, nanomaterials, ionic compounds, or any powder mixture thereof. The powder bed 240 may comprise a conductive material, a semi-conductive material, an insulating material, or any mixture thereof.

In order to enable a quick detection of powder smoke, the arrangement 200 preferably comprises at least one electron detecting arrangement 250, which may be arranged anywhere within the vacuum chamber 280 where electrons that have been scattered by hitting powder particles which levitate above the powder bed 240 may be detected. If the powder particles are detected in themselves, as in EP2231352, it does not matter which direction they come from. However, when electrons are detected, powder smoke detection is more reliable if it is ensured that the electrons really emanate from collisions with powder smoke particles. One way of ensuring this is to use a directional blocking arrangement 270. The electron detecting arrangement 250 may therefore comprise an electron detector 260 and a directional blocking arrangement 270, which prevents electrons not travelling in a selected direction from reaching the electron detector 260. The use of such a directional blocking arrangement 270 means that only electrons generated within a certain defined volume above the powder bed 240 can reach the electron detector 260—these electrons are most likely to be caused by the electron beam 220 hitting powder particles levitating above the powder bed 240. This ensures that electrons scattered for other reasons do not interfere with the detection of powder smoke.

FIGS. 1 and 2 schematically illustrate the use of an electron detecting arrangement 250 which is arranged at a side of the powder bed 240, while FIG. 3 schematically illustrates the use of an electron detecting arrangement 250 which is arranged below the powder bed 240. FIG. 3 also schematically illustrates the electron scattering caused by powder smoke above the powder bed 240.

Figure 4:
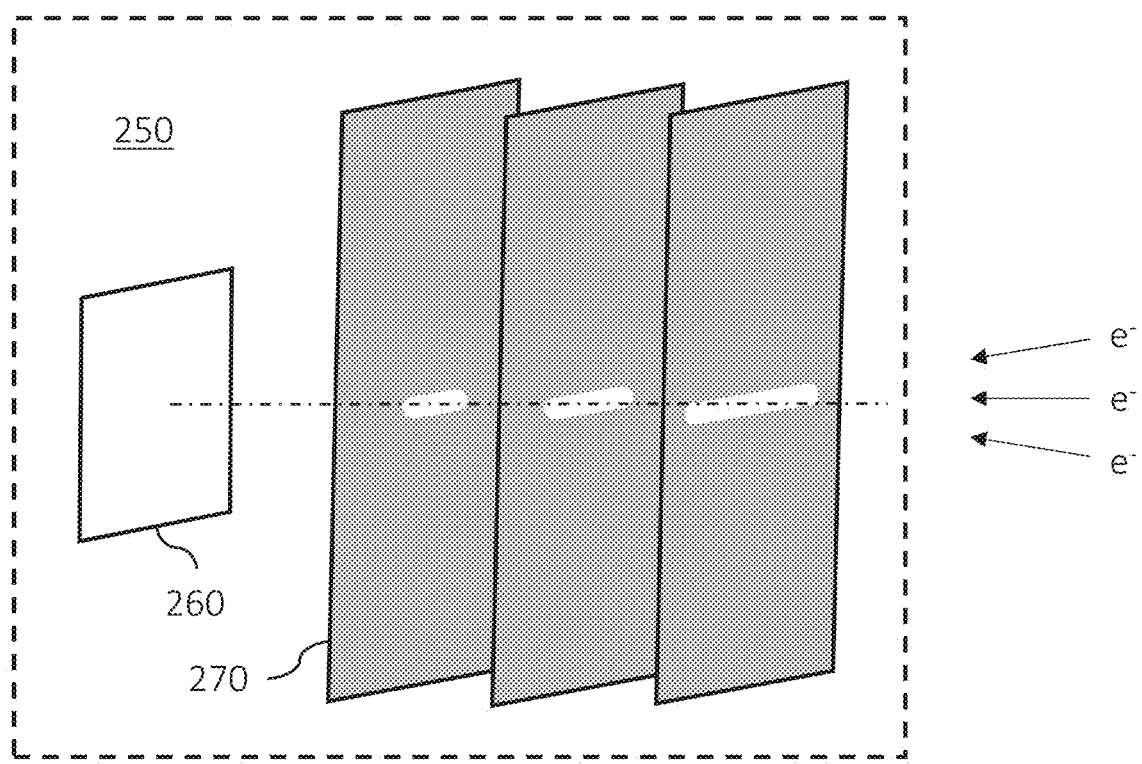
FIGS. 4-6 schematically illustrate embodiments of an electron detecting arrangement, in accordance with one or more embodiments described herein.

An embodiment of an electron detecting arrangement 250 that may be used in the embodiments of FIGS. 1-3 is schematically illustrated in FIG. 4. In this embodiment, an electron detector 260 is arranged behind a directional blocking arrangement 270 in the form of a number of thin plates having slits or holes in positions that are aligned between the plates, where the slits or holes may have different sizes. In the embodiment schematically illustrated in FIG. 4, the thin plates have horizontal slits of different lengths. Such a directional blocking arrangement 270 ensures that only electrons generated within a thin volume above the powder bed 240 (such as e.g. a few millimeters above the powder bed 240) can pass through the multiple slits or holes and thereby reach the electron detector 260. Electrons coming from other positions, such as e.g. directly from the powder bed 240, may pass the first slit or hole, but will then become trapped between the plates. It is possible to also apply electric potentials to one or more of the plates, in order to attract or repel electrons having certain energies.

Figure 5:
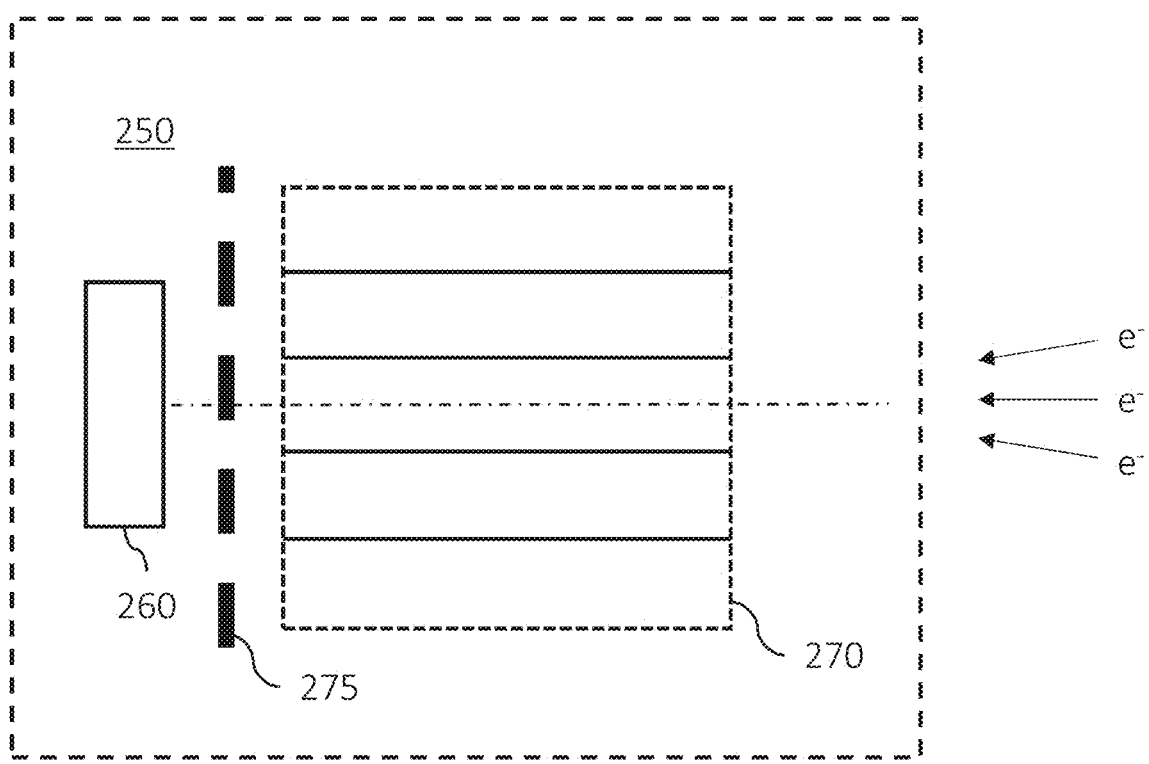

Another embodiment of an electron detecting arrangement 250 is schematically illustrated in FIG. 5. In this embodiment, an electron detector 260 is arranged behind a directional blocking arrangement 270 in the form of one or more channels having a surface comprising a material with low tendency to create scattered electrons. Such a directional blocking arrangement 270 may e.g. be simply a horizontal pipe. Only electrons generated within a thin volume above the powder bed 240 (such as e.g. a few millimeters above the powder bed 240) and travelling horizontally can then pass through the one or more channels and reach the electron detector 260. Electrons coming from other heights over the powder bed 240 may enter the one or more channels, but not pass through them. As long as the material has a low tendency to create scattered electrons, such electrons will also not create new electrons inside the channel. The electron detecting arrangement 250 may in embodiments (as schematically illustrated in FIG. 5) also comprise a grid 275 with an electric potential, in order to remove secondary electrons that may anyhow be created. Materials with low atomic number Z, such as e.g. carbon/graphite (Z=6), beryllium (Z=4), boron carbide (Z=5/6), or boron nitride (Z=5/7), generally have a low tendency to create scattered electrons. The channels may also be made in another material, which is then coated on the surface with e.g. graphite, or another material with a low atomic number. The channels may have different cross section shapes, such as e.g. round or elongated.

Figure 6:
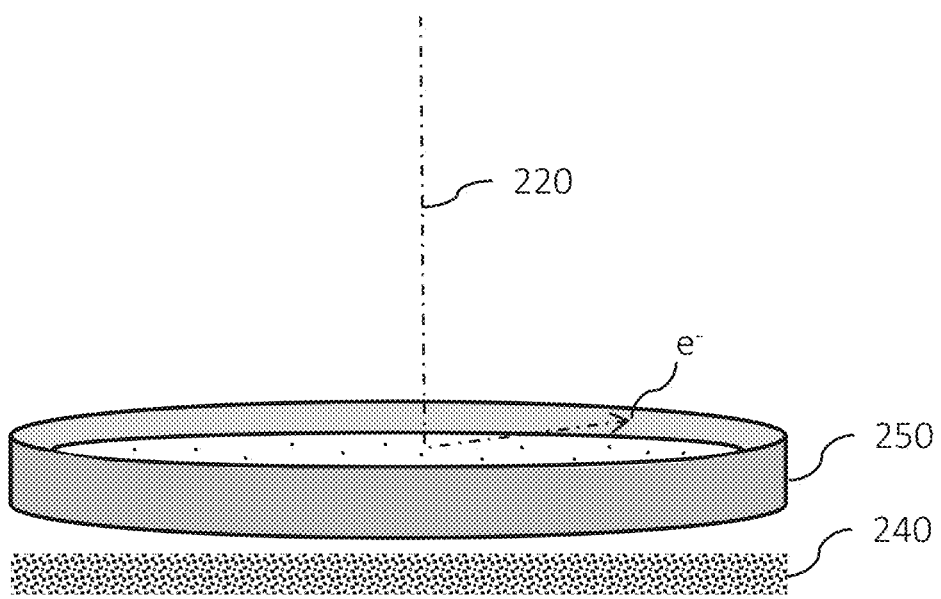

However, an electron detecting arrangement 250 may also be arranged in other positions, such as e.g. above the powder bed 240. FIG. 6 schematically illustrates an electron detecting arrangement 250 arranged almost directly above the powder bed 240. The electron detecting arrangement 250 schematically illustrated in FIG. 6 is a ring-shaped detector, which may have a directional blocking arrangement 270 in the form of a number of ring-shaped slits inside, in order to prevent electrons scattered for other reasons from interfering with the detection of powder smoke. The advantage of using a ring-shaped detector is that the detection area will be large, which provides a high sensitivity to electrons scattered from powder smoke. Thanks to the hole in the ring-shaped detector, the electron beam can pass from the electron beam source 210 to the powder bed 240. Several disc formed rings can be provided to form the slits in front of the ring-shaped detector, for providing directional sensitivity to the electron detecting arrangement 250. The ring-shaped detector does not have to be circular, but may have any shape as long as it comprises a hole for the electron beam 220. The ring-shaped detector may e.g. have a shape that corresponds the shape of the powder bed 240, so that it surrounds the whole powder bed 240.

The directional sensitivity of the electron detecting arrangement 250 may thus be achieved e.g. by providing a directional blocking arrangement 270 in the form of one or more channels. The channels may e.g. be formed by holes in the directional blocking arrangement 270, or by walls forming channels.

An electron detecting arrangement 250 may also be arranged high above the powder bed 240, e.g. at the top of the vacuum chamber 280, close to the electron beam source 210. Such an electron detecting arrangement 250 will typically detect backscattering of electrons from the powder bed 240 even when there is no powder smoke, but the presence of powder smoke will most probably affect the output from such an electron detecting arrangement 250, and thereby be detectable.

It is also possible for the arrangement 200 to comprise multiple electron detecting arrangements 250, located in different positions in the arrangement 200. This increases the sensitivity of the detection of electrons scattered from powder smoke.

The electron detector 260 may have a working principle identical to any of the well-known electron detector types used in scientific instruments such as e.g. electron microscopes. The electron detector 260 is typically arranged to turn electrons hitting the detector area into an electrical signal that is measured.

In embodiments, the electron detector 260 is a semiconductor detector.

In embodiments, the electron detector 260 also comprises an electron multiplier.

In embodiments, the electron detector 260 takes the form of a Faraday cup

The arrangement 200 is preferably arranged to immediately switch off the electron beam 220 if powder smoke is detected by at least one electron detecting arrangement 250 in the arrangement 200. This prevents the equipment from being damaged by powder smoke, and also ensures that a failed additive manufacturing process does not continue longer than necessary. The arrangement 200 may in embodiments be arranged to alert an operator of the arrangement 200 when powder smoke has been detected.

Figure 7:
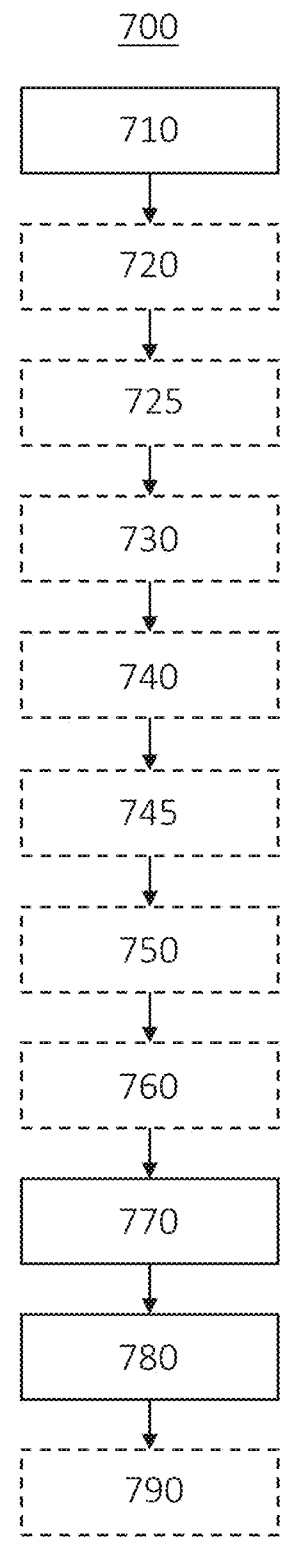
FIG. 7 schematically illustrates a method for detecting powder smoke during additive manufacturing, in accordance with one or more embodiments described herein.

FIG. 7 schematically illustrates a method 700 detecting powder smoke during additive manufacturing. The method 700 preferably comprises:

Step 710: arranging at least one electron detecting arrangement 250 in an arrangement 200 for additive manufacturing by selective fusion, using an electron beam 220, of a three-dimensional product from a powder bed 240.

Step 770: detecting electrons which have been scattered by the electron beam hitting powder particles which levitate above the powder bed 240.

Step 780: determining whether there is powder smoke based on the output from the at least one electron detecting arrangement 250.

This enables a very quick detection of powder smoke, since as soon as powder particles begin to levitate above the powder bed, they cause scattering of electrons in different directions, when the electron beam hits the powder particles.

The method 700 may further comprise one or more of:

Step 720: arranging at least one directional blocking arrangement 270 in the form of a number of plates having slits or holes in positions that are aligned between the plates. This is a simple way of creating a directional blocking arrangement, since electrons coming from other positions, such as e.g. directly from the powder bed 240, may pass the first slit or hole, but will then become trapped between the plates. It is possible to also apply electric potentials to the plates, in order to attract or repel electrons having certain energies.

Step 725: arranging at least one directional blocking arrangement 270 in the form of one or more channels having a surface comprising a material with low tendency to create scattered electrons. This is another simple way of creating a directional blocking arrangement, since electrons coming from other positions may not pass through the one or more channels.

Step 730: arranging at least one directional blocking arrangement 270 in the form of a number of ring-shaped slits inside a ring-shaped electron detector 260. The advantage of using a ring-shaped detector is that the detection area will be large, which provides a high sensitivity to electrons scattered from powder smoke. The ring-shaped detector does not have to be circular, but may have any shape as long as it comprises a hole for the electron beam 220. The ring-shaped detector may e.g. have a shape that corresponds the shape of the powder bed 240, so that it surrounds the whole powder bed 240.

Step 740: arranging at least one electron detecting arrangement 250 at a side of the powder bed 240.

Step 745: arranging at least one electron detecting arrangement 250 below the powder bed 240.

Step 750: arranging at least one electron detecting arrangement 250 above the powder bed 240.

Step 760: preventing any electrons not travelling in a selected direction from reaching the electron detector 260, when the at least one electron detecting arrangement 250 comprises an electron detector 260 and a directional blocking arrangement 270. This may be used to ensure that only electrons scattered by powder particles located close to the powder bed 240 reach the electron detector.

Step 790: immediately switching off the electron beam 220 if powder smoke is detected by at least one electron detecting arrangement 250 in the arrangement 200. The arrangement 200 may in embodiments be arranged to alert an operator of the arrangement 200 when powder smoke has been detected.

The above listed steps may be performed in any order.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. An arrangement for additive manufacturing by selective fusion, using an electron beam, of a three-dimensional product from a powder bed, the arrangement comprising at least one electron detecting arrangement arranged to detect powder smoke by detecting electrons which have been scattered by the electron beam hitting powder particles which levitate above the powder bed, wherein the at least one electron detecting arrangement comprises an electron detector and a directional blocking arrangement, arranged to prevent any electrons not travelling in a selected direction from reaching the electron detector.

2. The arrangement according to claim 1, wherein at least one directional blocking arrangement is in the form of a number of plates having slits or holes in positions that are aligned between the plates.

3. The arrangement according to claim 1, wherein at least one directional blocking arrangement is in the form of one or more channels having a surface comprising a material with low tendency to create scattered electrons.

4. The arrangement according to claim 1, wherein at least one directional blocking arrangement is in the form of a number of ring-shaped slits inside a ring-shaped electron detector.

5. The arrangement according to claim 1, wherein at least one electron detecting arrangement is arranged at a side of the powder bed.

6. The arrangement according to claim 1, wherein at least one electron detecting arrangement is arranged below the powder bed.

7. The arrangement according to claim 1, wherein at least one electron detecting arrangement is arranged above the powder bed.

8. The arrangement according to claim 1, wherein the arrangement is arranged to immediately switch off the electron beam if powder smoke is detected by at least one electron detecting arrangement in the arrangement.

9. A method for detecting powder smoke during additive manufacturing, the method comprising:
arranging at least one electron detecting arrangement in an arrangement for additive manufacturing by selective fusion, using an electron beam, of a three-dimensional product from a powder bed;
detecting electrons which have been scattered by the electron beam hitting powder particles which levitate above the powder bed; and
determining whether there is powder smoke based on the output from the at least one electron detecting arrangement,
wherein the at least one electron detecting arrangement comprises an electron detector and a directional blocking arrangement, further comprising preventing any electrons not travelling in a selected direction from reaching the electron detector, using the directional blocking arrangement.

10. The method according to claim 9, further comprising arranging at least one directional blocking arrangement in the form of a number of plates having slits or holes in positions that are aligned between the plates.

11. The method according to claim 9, further comprising arranging at least one directional blocking arrangement in the form of one or more channels having a surface comprising a material with low tendency to create scattered electrons.

12. The method according to claim 9, further comprising arranging at least one directional blocking arrangement in the form of a number of ring-shaped slits inside a ring-shaped electron detector.

13. The method according to claim 9, further comprising arranging at least one electron detecting arrangement at a side of the powder bed.

14. The method according to claim 9, further comprising arranging at least one electron detecting arrangement below the powder bed.

15. The method according to claim 9, further comprising arranging at least one electron detecting arrangement above the powder bed.

16. The method according to claim 9, further comprising immediately switching off the electron beam if powder smoke is detected by at least one electron detecting arrangement in the arrangement.

* * * * *